United States Patent
Peters et al.

(10) Patent No.: US 8,566,475 B2
(45) Date of Patent: Oct. 22, 2013

(54) BROADCAST DRIVEN VIRTUAL COMMUNITY OF P2P NETWORK

(75) Inventors: Marc Andre Peters, Eindhoven (NL); Wilhelmus Henrica Gerarda Maria Van Den Boomen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 503 days.

(21) Appl. No.: 10/596,457

(22) PCT Filed: Dec. 3, 2004

(86) PCT No.: PCT/IB2004/052650
§ 371 (c)(1), (2), (4) Date: Jun. 14, 2006

(87) PCT Pub. No.: WO2005/062572
PCT Pub. Date: Jul. 7, 2005

(65) Prior Publication Data
US 2007/0198740 A1    Aug. 23, 2007

(30) Foreign Application Priority Data
Dec. 19, 2003 (EP) .................................... 03104860

(51) Int. Cl.
*G06F 15/16* (2006.01)
(52) U.S. Cl.
USPC .............. 709/245; 725/105; 725/44; 709/204
(58) Field of Classification Search
USPC .................................................. 709/204, 245
See application file for complete search history.

(56) References Cited

U.S. PATENT DOCUMENTS

| 6,025,801 | A | 2/2000 | Beitel |
| 6,425,012 | B1 | 7/2002 | Trovato et al. |
| 7,552,460 | B2 * | 6/2009 | Goldman ........................ 725/44 |
| 2002/0038352 | A1 | 3/2002 | Ashley |
| 2002/0116471 | A1 | 8/2002 | Shteyn |
| 2002/0122112 | A1 | 9/2002 | Mallart et al. |
| 2002/0156875 | A1 * | 10/2002 | Pabla ............................ 709/220 |
| 2003/0093790 | A1 * | 5/2003 | Logan et al. .................... 725/38 |
| 2003/0110503 | A1 | 6/2003 | Perkes |
| 2003/0120634 | A1 * | 6/2003 | Koike et al. ........................ 707/1 |
| 2003/0191753 | A1 * | 10/2003 | Hoch ................................. 707/3 |
| 2003/0237097 | A1 * | 12/2003 | Marshall et al. ............... 725/105 |

FOREIGN PATENT DOCUMENTS

| WO | WO9953691 | 10/1999 |
| WO | WO02067473 | 8/2002 |

OTHER PUBLICATIONS

Frans De Jong, NOB, Philips NL, Philips UK, NDS, BBC, NOB Elisa, KPN, FHG, UOL: "Share it! Deliverable #3: Description of example applications", Last updated on Dec. 2, 2002, p. 14-15.*
De Jong, "Share It" Nov. 30, 2001, Philips, European Commission Information Society Technologies Project IST-2000-28703, pp. 1-93.
"Stretching the Fabric of the Net: Examining the Present and Potential of Peer-to-Peer Technologies", Software & Information Industry Association (SIIA), 2001.
"Specification Series: S-2 on: System Description (Informative With Mandatory Appendix B)", Document SP002v1.2, Apr. 5, 2002.

* cited by examiner

*Primary Examiner* — Emmanuel L Moise
*Assistant Examiner* — Nahran Abu Roumi

(57) ABSTRACT

Meta data accompanying a content broadcast includes an identifier of a group of peers on a P2P network. The group provides or shares a service to enable peers to connect and interact via the P2P network within the context of the broadcast.

4 Claims, 2 Drawing Sheets

US 8,566,475 B2

BROADCAST DRIVEN VIRTUAL COMMUNITY OF P2P NETWORK

FIELD OF THE INVENTION

The invention relates to a method of enabling to identify a group of peers on a peer-to-peer (P2P) data network. The invention further relates to identifying a group of peers on a P2P network, and to an apparatus and to control software.

BACKGROUND ART

The term P2P refers to a type of transient Internet network that allows a group of users with the same networking program to connect with each other, directly access files from one another's data storage and provide other services among each other via the network. Various P2P configurations exist, such as a centralized configuration, a decentralized configuration and a controlled centralized configuration. In a centralized configuration, the system depends on a central server that directs the communication between peers. "Napster" is an example of a centralized configuration. A decentralized configuration has not got a central server, and each peer is capable of acting as a client, as a server or as both. A user connects to the decentralized network by connecting to another user who is connected. "Gnutella" and "Kazaa" are examples of decentralized networks. In a controlled decentralized configuration a user may act as a client, as a server or as both as in the decentralized configuration, but specific operators control which user is allowed to access which particular server. "Morpheus" is an example of the latter. For a brief discussion of P2P network architectures see, e.g., "Stretching The Fabric Of The Net: Examining the present and potential of peer-to-peer technologies", Software & Information Industry Association (SIIA), 2001.

SUMMARY OF THE INVENTION

The inventors foresee that P2P networks will emerge connecting a plurality of network-enabled consumer electronics (CE) apparatus such as digital video recorders (DVRs) and home networks that have large data storage capacity. DVRs, also referred to as personal video recorders (PVRs), are CE apparatus with a hard-disk drive (HDD) or an optical disc drive that enable the end-user to record TV broadcasts, e.g., for play-back at a later time or for time-shifting during the broadcast. Such a P2P network will give rise to virtual dynamic communities of users interested in specific content information, virtual because it is not physical or geographical, and dynamic because a specific user may belong to various communities depending on his/her activities and interests with respect to content.

Accordingly, these technologies are believed to become a driver of a trend in society that is giving rise to an increasing number of subcultures, physical and virtual, with members from all over the globe. A person can belong to many groups at the same time, e.g., be a music fan, hobbyist, sportsman or sportswoman, businessperson, classmate, user of a particular brand of product, etc. This sort of grouping has a highly volatile, or temporal, character as people move into or out of certain groups depending on their dominant identity at the moment. People may thus assume multiple social or activity-related identities and it depends on their context which identity (or interest) is dominant. For example, a person may be receptive of information about food supplements while sporting, but ignores this information during the break of an exciting thriller.

The inventors now propose to link broadcast content to one or more groups in a P2P network. Members of such a group can share content with each other, and run services that are defined within that group. Shared content can be, for example, similar programs, background information, pictures, interviews. Examples of services include a chat service, a recommendation service, or a specific topical or supporting service related to the broadcast program. When the broadcast content is linked to P2P groups, a user who is watching an associated program, can immediately obtain links to P2P groups that are related to this program, become a member of such group and use the services offered within the group. A P2P group is then a virtual private network that improves the scalability by routing messages only through members of that group and not to all peers on the network.

In order to link broadcast programs to P2P groups, the inventors propose the following. Group identifiers (group IDs) are, for example, embedded in the (digital) broadcast stream, linking broadcast to P2P groups. A piece of content can be linked to one or more groups. When a user is watching a broadcast program, the DVR automatically acquires the group ID(s), which are linked to this program, from the broadcast stream. The user can use these group IDs to look up information about the groups, and become a (temporary) member of one or more of these groups. In order for this approach to work, the group ID has to be globally unique. This can easily be achieved, for example by using the Domain Name system (DNS) name of the broadcaster/service provider in the group ID. Third parties can advertise their groups by negotiating with the broadcaster about linking their groups to specific programs. The advantage for the user is clear: an uninterested user is not bothered by this approach, whereas an interested user has the option to access the groups in a very convenient way.

Instead of embedding the identifiers in the relevant broadcasts themselves, the identifiers can be embedded in an electronic program guide (EPG). Upon selecting a specific broadcast program from the EPG while browsing or in order to have the TV tune-in on the relevant channel, the associated identifier is retrieved from the EPG.

Linking broadcast content to P2P groups is a very interesting feature for broadcasters and service providers. This way they can easily offer additional content as well as services to those users who are most likely to be interested in these items. Next to that they can negotiate with third parties the linking of their groups to specific programs, which in turn benefits the commercial model.

More specifically, the invention relates to a method of enabling to identify a group of peers on a P2P network. The method comprises enabling to use an identifier associated with a content broadcast for identifying the group. An embodiment of the method comprises, e.g., providing the identifier in the broadcast, e.g., embedded in the digital broadcast stream or in the vertical blanking interval (VBI) of an analog broadcast. Another embodiment comprises providing the identifier via an EPG. A further embodiment comprises enabling to generate or otherwise obtain the identifier from a further identifier representative of the content broadcast. For example, the program title of the content broadcast can serve the purpose of the first identifier that is mapped onto one or more further identifiers of special interest groups on the P2P network. The mapping itself can be carried out at the network equipment of the relevant end-user or at a server on the P2P network. As to an example of the latter option, see the TV-Anytime CRID approach further discussed below. Again, the method of the further embodiment may comprise providing the further identifier in the broadcast or in an EPG.

Above embodiment of the invention, i.e., the "method of enabling", focuses on parties upstream of the end-user, e.g., the provider of the identifiers that allows associating content broadcasts with groups on a P2P network. In another embodiment, the invention relates to a method of identifying a group of peers on a P2P network. The method comprises using an identifier associated with a content broadcast for identifying the group. The method may comprise deriving the identifier via the broadcast or via an EPG. The method may comprise generating, or enabling to generate, or otherwise obtaining the identifier from a further identifier representative of the content broadcast, the further identifier being received via the broadcast or via an EPG. Again, see the TV-Anytime CRID approach below for an example. What has been clarified above with respect to the first embodiment applies to this other embodiment as well. Note that this other embodiment focuses on events downstream of the provider, e.g., at the site of end-user.

Still another embodiment of the invention relates to an apparatus configured for use on a data network. The apparatus is operative to process an identifier associated with content broadcast to enable to identify a group of peers on a P2P network. The apparatus receives the identifier, e.g., from the broadcast of via an EPG listing that broadcast. Alternatively, the apparatus is operative to process a further identifier representative of the broadcast so as to generate or otherwise obtain the identifier of the group of peers.

Yet another embodiment relates to control software for configuring a data network apparatus to process an identifier associated with content broadcast for identifying a group of peers on the data network. The control software receives the identifier, e.g., from the broadcast of via an EPG listing that broadcast. Alternatively, the control software is operative to process a further identifier representative of the broadcast so as to generate or otherwise obtain the identifier of the group of peers.

Accordingly, meta data accompanying a (radio, TV, Internet, etc.) content broadcast includes an identifier of a group of peers on a P2P network. This enables peers to connect and interact via the P2P network within the context of the broadcast.

BRIEF DESCRIPTION OF THE DRAWING

The invention is explained in further detail, by way of example and with reference to the accompanying drawing wherein.

Throughout the figures, same reference numerals indicate similar or corresponding features.

DETAILED EMBODIMENTS

Figure 1:
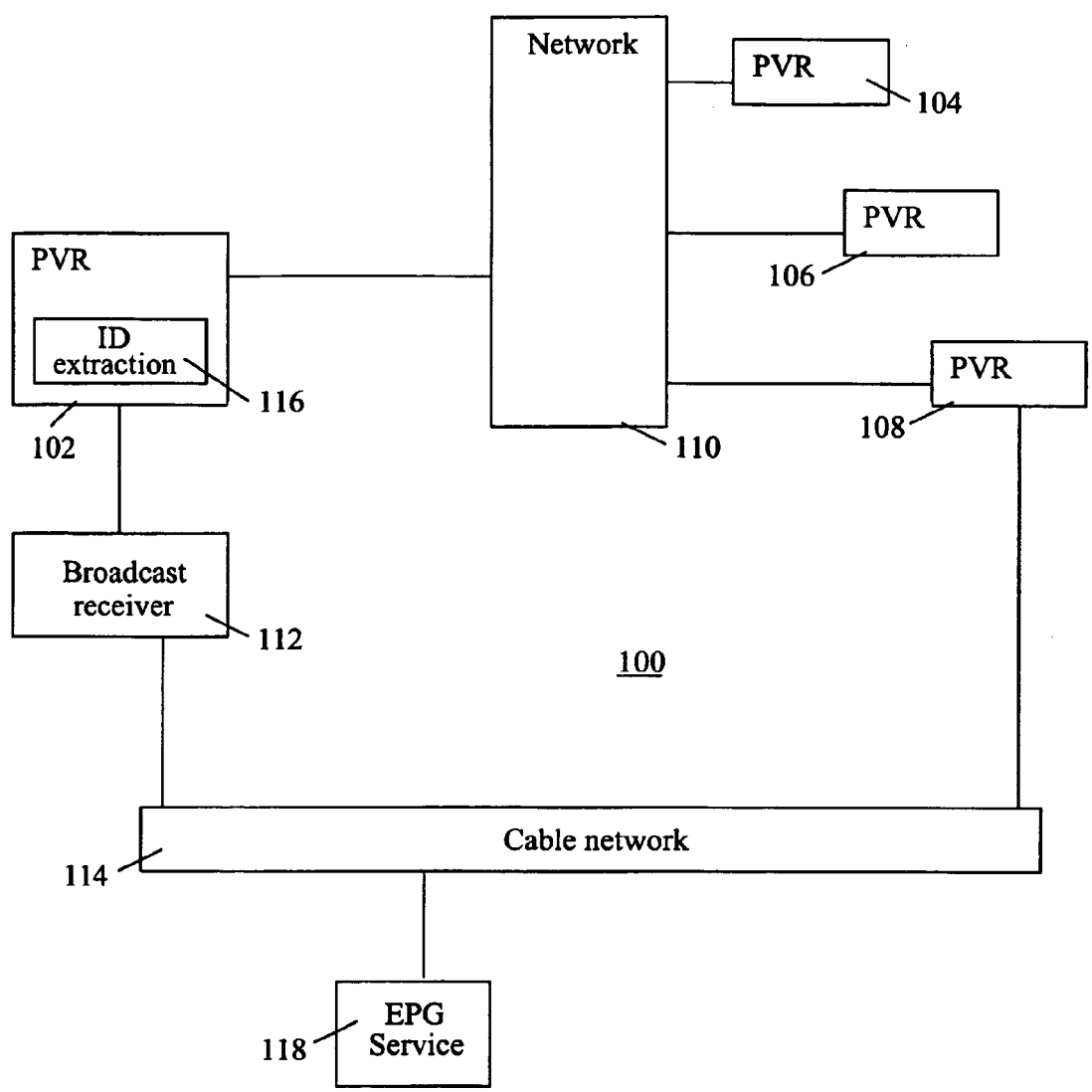
FIG. 1 is a block diagram of a system in the invention.

FIG. 1 is a block diagram of a system 100 in the invention. System 100 comprises network enabled CE apparatus 102, 104, 106, . . . , and 108 that form a P2P network via data network 110. In the example shown, each of apparatus 102-108 comprises a PVR or a PC. System 100 further comprises a broadcast receiver 112, e.g., a TV tuner, for receiving programs broadcast via a broadcast infrastructure 114, e.g., terrestrial, satellite, cable, etc. Receiver 112 is connected to PVR 102. PVR 102 has onboard software 116 to extract meta information embedded in a broadcast received by receiver 112. For example, the meta information is embedded in the VBI of an analog broadcast or in the data stream of a digital broadcast. The meta information is assumed to comply with a pre-determined protocol so that software 116 can selectively extract the proper items from the meta information and process them. Alternatively, software 116 operates on an EPG supplied by a service provider 118 via, for example, cable network 114 or via data network 110. Software 116 then parses the EPG information to acquire meta information specific to a particular broadcast. Each of apparatus 104-108 comprises software (not shown) functionally similar to software 116.

The meta information extracted by software 116 from the broadcast or from the EPG serves as an identifier to identify a group of peers, e.g., apparatus 104 and 106. Accordingly, reception of the broadcast program, or parsing of the EPG with respect to a specific broadcast listed therein, initiates the relevant ones of apparatus 102-108 to be identified as forming a peer group.

For example, the group is dedicated to a specific live broadcast such as the live coverage of a sports event. The group provides, e.g., a chatroom that lets the end-users of the peers communicate via text or voice via network 110. Text comments can be blended in with the rendering of the broadcast itself at the compatible apparatus of the connected users, e.g., as subtitle overlays. Verbal comments, given via a microphone (not shown) at the relevant end-user can be made available to the other connected users via a loudspeaker (not shown) of their respective ones of apparatus 102-108, or of their respective broadcast receiver.

In another example, service 118 enables end-users of connected ones of apparatus 102-108 to participate in the broadcast program itself via data network 110. The program is, e.g., a game between participants whose interactions may include submitting replies to questions from the host as in a quiz, controlling real equipment in dexterity oriented exercises, or virtual equipment or avatars in a video game broadcast. In this regard, see, e.g., U.S. Pat. No. 6,025,801 issued to Brad Beitel for VIDEO GAME WITH LOCAL UPDATES MITIGATES LATENCY EFFECTS IN WIDE AREA NETWORK, and incorporated herein by reference. This U.S. patent relates to enabling multiple users to share a virtual environment through an interactive software application. State changes of a specific user are transmitted to one or more other users dependent on respective relative distances in the virtual environment between the specific user and each respective one of the other users. This conditional transmission reduces message traffic and allows a virtual environment to scale indefinitely.

The users of apparatus 102-108 are connected based on a binding factor formed by the broadcast, and form a group of peers available for interaction via data network 110. The type of interaction is to be decided by the relevant users themselves, and depends on the capabilities of their network-enabled equipment, including apparatus 102-108. For example, if apparatus 102-108 comprise PVRs or connect to the relevant user's archive of recordings via the home network, peers may browse the locally recorded content. The assumption then is that someone who is watching a certain broadcast is likely to have recorded previous broadcasts of a similar genre. A search for specific recorded content available on the P2P network of PVRs 102-108 is then more focused.

A particular implementation of the invention relates to the usage of a content identifier, referred to as a CRID (Content Reference ID), which has been introduced into the TV-Anytime concept. The TV-Anytime forum aims to specify a set of industry-wide standards for Digital Video Recorders (DVRs), also referred to as Personal Video Recorders (PVRs). A PVR is a video recorder with, e.g., a hard disk (HD) for video storage. Phase One of TV-Anytime enables audio and video search, capture and playback of content. It also enables segmentation and indexing of that content. Phase Two will specify open standards that build on the foundations of Phase One specifications and will include areas such as targeting, redistribution and new content types. Content redistribution includes moving content around among devices and systems. Examples of redistribution are, e.g., content sharing, home networking and removable media. Content sharing is the P2P distribution of content over provider networks. Home networking relates to the sharing of content among multiple storage devices and display terminals within a defined private physical network. Removable media can be involved in the redistribution of content on physical storage such as optical discs, flash cards, etc. (i.e., a non-transitory, computer readable medium).

One feature of the TV-Anytime specifications is content referencing. This specification provides the ability to map a unique identifier of a piece of content such as a TV program on a time and/or location (e.g., TV channel) where this piece of content can be acquired. The identifier is called a CRID as already mentioned above. CRIDs comply with a hierarchical format that enables to represent relationships between pieces of content as is explained further below. For more information on TV-Anytime and CRIDs see, e.g., Document SP002v1.2 "Specification Series: S-2 on: System Description (Informative with mandatory Appendix B)", Apr. 5, 2002; and U.S. Patent Application Publication No. U.S. 20020038352 HANDLING BROADCAST DATA TOKENS filed for Alexis Ashley and incorporated herein by reference. In the terminology of TV-Anytime, an organization that creates CRIDs is called an "authority". There can be any number of authorities producing CRIDs, but each authority is uniquely identified by a name. The TV-Anytime standard uses the DNS name registration system to ensure that these names are unique. Each CRID has the name of the authority that issued it embedded in the CRID, and there is accordingly a requirement for a means to take an authority name from a CRID, and find the server on the Internet where the CRID can be converted to a location.

When a broadcaster or another service supplier embeds TV-Anytime CRIDs in the broadcast stream or in an EPG, these CRIDs can be used to link a broadcast to one or more P2P groups and their associated services. In order to do this, the TV-Anytime resolving mechanism for CRIDs is to be extended. The current resolving mechanism resolves or translates a CRID into other CRIDs or digital broadcast locators (see, for example, the SP002v1.2 "Specifications Series" mentioned above). Via this mechanism it is possible to link pieces of content together, through a so-called group CRID. The word "group" in the expression "group-CRID" refers to a collection of pieces of content information. For example, a CRID for the TV series "Friends" resolves into all the different episodes. The CRIDs of the different episodes can be resolved again into the actual broadcast locators. The inventors now propose to use a similar mechanism, where a CRID can be resolved into a peer group ID. The word "group" in the expressions "peer group" and "group of peers" refers to a community of peers on a P2P network. A CRID can be linked to one or more groups on a P2P network through the relevant authority. In the CRID resolving mechanism as used in the known TV-Anytime configuration, the relevant authority is identified, and the CRID is sent to the relevant authority's server over IP. The authority then responds by providing a list of CRIDs in case the CRID submitted was a group-CRID, or a list of locations, i.e., times and TV channels of the broadcasts. In the resolving mechanism proposed by the inventors, the relevant authority responds by sending, in addition or selectively instead, a list of identifiers of the associated peer groups on the P2P network Third parties can advertise their groups, e.g., by means of negotiating with the broadcaster about linking their groups to specific programs. The advantage for the user is clear: an uninterested user is not bothered by this approach, whereas an interested user has access to the groups in a convenient way. Linking broadcast content to P2P groups is a very interesting feature for broadcasters and service providers. In this manner, they can easily offer additional content as well as services to users, while being ensured that they reach those users who are interested in these items. Next to that they can negotiate with third parties about linking their peer groups to specific content programs, which clearly benefits the commercial model.

Accordingly, when a user is watching a broadcast program, the HD recorder is aware of the CRID associated with that program, and can use the resolving mechanism to obtain related P2P-group IDs. The user can use these group IDs to look at information about the groups, and become a member of one or more of these groups.

Figure 2:
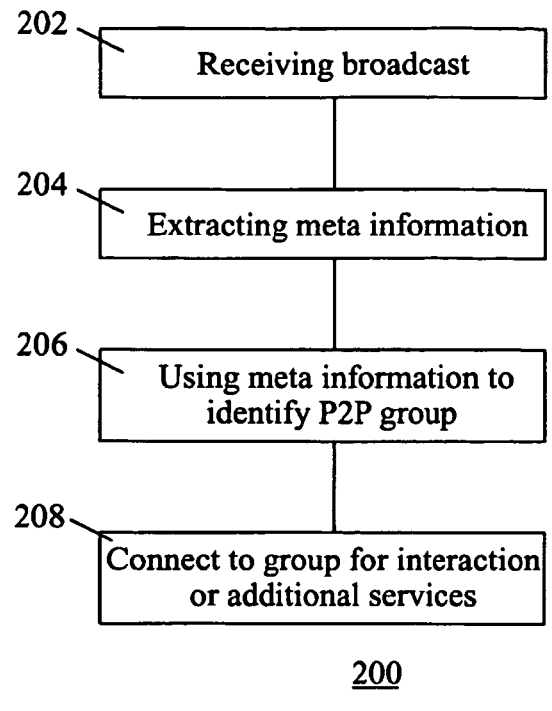
FIGS. 2 and 3 are flow diagrams illustrating operation of the system of FIG. 1.
Figure 3:
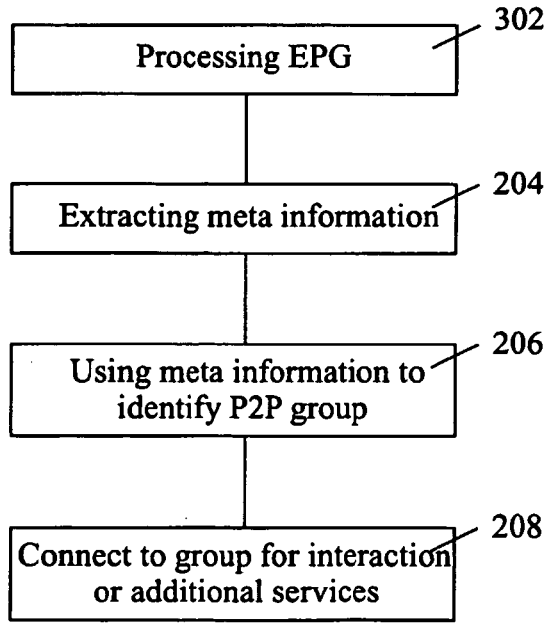

FIGS. 2 and 3 illustrate processes 200 and 300, respectively, in system 100. In FIG. 2, a step 202 represents receiving the content broadcast, e.g., a TV program via cable. In a step 204, meta data is extracted from the broadcast. In a step 206, the meta data is analyzed for identifying one or more relevant P2P groups on network 110. In a step 208, connection is made to the group for further interaction. Process 300 of FIG. 3 differs from process 200 in FIG. 2 in that the former has a step 302, wherein EPG data is processed.

What has been described above with respect to TV programs may also be applied to radio programs.

Incorporated herein by reference:

U.S. Ser. No. 09/053,448 filed Apr. 1, 1998, for Raoul Mallart and Atul Sinha for GROUP-WISE VIDEO CONFERENCING USES 3D-GRAPHICS MODEL OF BROADCAST EVENT, published as International Application WO9953691. This document relates to integrating a TV broadcast service to multiple geographically distributed end users with a conferencing mode. Upon a certain event in the broadcast, specific groups of end users are switched to a conference mode under software control so that the group is enabled to discuss the event. The conference mode is enhanced by a 3D-graphics model of the video representation of the event that is downloaded to the groups. The end users are capable of interacting with the model to discuss alternatives to the event.

U.S. Ser. No. 09/789,906 filed Feb. 20, 2001, for Eugene Shteyn for BROADCAST AND PROCESSING OF META-INFORMATION ASSOCIATED WITH CONTENT MATERIAL, published as International Application WO02067473. This patent document relates to including meta-information with the broadcast of content material. The meta-information contains information for accessing available content material, and preferably contains characterizing information related to the material. This characterizing information may include, for example, a synopsis, a list of performers or characters, a genre, and so on. The access information may include, for example, a scheduled broadcast time, an access channel, a URL identifier, a source provider, purchase information, and so on. Generally the meta-information consumes substantially less memory or bandwidth than the broadcast content material. A processing device at the user's broadcast receiver is configured to process this information-rich meta-information corresponding to a large volume of available content material to facilitate filtering of the available material, or automating or optimizing the selection process. A provider of the content material can use the meta-information to convey advertisements, information related to purchasable content material, and so on, to enhance revenues.

U.S. Pat. No. 6,425,012 issued to Karin Trovato et al. This patent relates to a system that creates a chat network based on a time of each chat access request. This system is premised on the observation that an event can affect a number of people at the same time, and some of these people may have a desire to discuss that event at that time. For example, when a television news story is broadcast, thousands of people will receive the news at the same time, and it is likely that in at least some households, a discussion will ensue relating to the topic of the news story. Similarly, when a particular play or call is made at a sporting event, the discussions, which immediately follow, are typically directed to that play or call. That is, the fact that a number of people experience the same event at the same time increases the likelihood that many people would be interested in discussing that same event at that time. Therefore, the time that a person initiates a chat session is used as a parameter to determine which chat room the person is placed. Other parameters may also be used, such as the particular television station that the person is watching at that time, the person's locale, as well as a set of predefined personal interest factors, or profile, associated with the person. For example, the chat server may place the first dozen people who initiate a chat session at 8:02 p.m. on Monday while viewing a given television station, and have expressed an interest in sports, in one chat room, based on the likelihood that these people want to discuss the Monday night football game. By forming chat rooms based on the time of entry and other relevant factors, the chat rooms are likely to be topic-specific, without incurring the overhead typically associated with the establishment and maintenance of topic-specific chat rooms. Also, these time-of-entry chat rooms can be structured to be of limited duration, obviating the overhead burden of deleting a topic-specific chat room when the topic generates only waning interest.

The invention claimed is:

1. A method of enabling to identify a specific broadcast driven group of peers among multiple groups of peers on a peer-to-peer network, the method comprising:
   providing, via a broadcast network, a specific identifier of multiple identifiers that comprise globally unique group identifiers (group IDs) for linking a content broadcast to the specific broadcast driven group of peers;
   deriving, via a network-enabled consumer electronic apparatus, at an end-user site the specific identifier (i) from a further identifier, that comprises a DNS name of (i)(1) a broadcaster/service provider of the content broadcast or (i)(2) third party groups having a broadcaster negotiated link to the content broadcast, embedded in a broadcast stream of the content broadcast in response to a reception of the content broadcast, (ii) from a further identifier, that comprises a DNS name of (ii)(1) a broadcaster/service provider of the content broadcast or (ii)(2) third party groups having a broadcaster negotiated link to the content broadcast, embedded in an electronic program guide (EPG) in response to selecting the content broadcast from the EPG, and (iii) from a still further identifier that comprises (iii)(1) a program title being representative of the content broadcast that is used as a first identifier for mapping a peer group identifier (peer group ID) into the derived specific identifier and (iii)(2) a TV-anytime Content Reference Identifier that is also used for mapping the peer group ID as part of the step of deriving; and
   responsive to the specific identifier being derived, enabling, via the network-enabled consumer electronic apparatus, at the end-user site (i) a broadcast driven virtual private network connection within the peer-to-peer network (ii) to the specific broadcast driven group of peers (iii) specifically within a context of the content broadcast (iv) to form a corresponding specific broadcast driven virtual private network that improves the scalability of the virtual private network connection of the specific broadcast driven group of peers within the peer-to-peer network (v) by routing messages of the specific broadcast driven group of peers only through members of that group via the mapped peer group ID and not to all peers of the multiple groups of peers on the peer-to-peer network.

2. A method of identifying a specific broadcast driven group of peers among multiple groups of peers on a peer-to-peer network, the method comprising:
   providing, via a broadcast network, a specific one of multiple identifiers that comprise globally unique group identifiers (group IDs) for linking a content broadcast to the specific broadcast driven group of peers;
   deriving, via a network-enabled consumer electronic apparatus, at an end-user site the specific identifier of the specific broadcast driven group of peers on a peer-to-peer network (i) from a further identifier, that comprises a DNS name of (i)(1) a broadcaster/service provider of the content broadcast or (i)(2) third party groups having a broadcaster negotiated link to the content broadcast, embedded in a broadcast stream of the content broadcast in response to a reception of the content broadcast, (ii) from a further identifier, that comprises a DNS name of (ii)(1) a broadcaster/service provider of the content broadcast or (ii)(2) third party groups having a broadcaster negotiated link to the content broadcast, embedded in an electronic program guide (EPG) in response to a selection of the content broadcast from the EPG, and (iii) from a still further identifier that comprises (iii)(1) a program title being representative of the content broadcast that is used as a first identifier for mapping a peer group identifier (peer group ID) into the derived specific identifier and (iii)(2) a TV-anytime Content Reference Identifier that is also used for mapping the peer group ID; and
   linking, via the network-enabled consumer electronic apparatus and the peer-to-peer network, (i) specifically within a context of the content broadcast (ii) a specific broadcast driven virtual private network connection within the peer-to-peer network at the end-user site (iii) the specific broadcast driven group of peers using the specific one of multiple identifiers (iv) to form a corresponding specific broadcast driven virtual private network that improves the scalability of the virtual private network connection of the specific broadcast driven group of peers within the peer-to-peer network (v) by routing messages of the specific broadcast driven group of peers only through members of that group via the mapped peer group ID and not to all peers of the multiple groups of peers on the peer-to-peer network.

3. An apparatus configured to identify a specific broadcast driven group of peers among multiple groups of peers for use on a peer-to-peer network, comprising:
   means for providing a specific one of multiple identifiers that comprise globally unique group identifiers (group IDs) for linking a content broadcast to the specific broadcast driven group of peers;
   means for deriving the specific identifier of the specific broadcast driven group of peers on a peer-to-peer network (i) from a further identifier, that comprises a DNS name of (i)(1) a broadcaster/service provider of the content broadcast or (i)(2) third party groups having a broadcaster negotiated link to the content broadcast, embedded in a broadcast stream of the content broadcast in response to a reception of the content broadcast, (ii) from a further identifier, that comprises a DNS name of (ii)(1) a broadcaster/service provider of the content broadcast or (ii)(2) third party groups having a broadcaster negotiated link to the content broadcast, embedded in an electronic program guide (EPG) in response to a selection of the content broadcast from the EPG, and (iii) from a still further identifier that comprises (iii)(1) a program title being representative of the content broadcast that is used as a first identifier for mapping a peer group identifier (peer group ID) into the derived specific identifier and (iii)(2) a TV-anytime Content Reference Identifier that is also used for mapping the peer group ID; and means for linking (i) specifically within a context of the content broadcast (ii) a specific broadcast driven virtual private network connection within the peer-to-peer network at an end-user site (iii) the specific broadcast driven group of peers using the specific one of multiple identifiers (iv) to form a corresponding specific broadcast driven virtual private network that improves the scalability of the virtual private network connection of the specific broadcast driven group of peers within the peer-to-peer network (v) by routing messages of the specific broadcast driven group of peers only through members of that group via the mapped peer group ID and not to all peers of the multiple groups of peers on the peer-to-peer network.

4. A non-transitory computer-readable medium having stored thereon control software for causing a data network apparatus to identify a specific broadcast driven group of peers among multiple groups of peers for use on a peer-to-peer network and operative to:

provide a specific one of multiple identifiers that comprise globally unique group identifiers (group IDs) for linking a content broadcast to the specific broadcast driven group of peers;

derive the specific identifier of the specific broadcast driven group of peers among multiple groups of peers on data peer-to-peer network (i) from a further identifier, that comprises a DNS name of (i)(1) a broadcaster/service provider of the content broadcast or (i)(2) third party groups having a broadcaster negotiated link to the content broadcast, embedded in a broadcast stream of the content broadcast in response to a reception of the content broadcast, (ii) from a further identifier, that comprises a DNS name of (ii)(1) a broadcaster/service provider of the content broadcast or (ii)(2) third party groups having a broadcaster negotiated link to the content broadcast, embedded in an electronic program guide (EPG) in response to a selection of the content broadcast from the EPG, and (iii) from a still further identifier that comprises (iii)(1) a program title being representative of the content broadcast that is used as a first identifier for mapping a peer group identifier (peer group ID) into the derived specific identifier and (iii)(2) a TV-anytime Content Reference Identifier that is also used for mapping the peer group ID; and link (i) specifically within a context of the content broadcast (ii) a specific broadcast driven virtual private network connection within the peer-to-peer network at an end-user site (iii) the specific broadcast driven group of peers using the specific one of multiple identifiers (iv) to form a corresponding specific broadcast driven virtual private network that improves the scalability of the virtual private network connection of the specific broadcast driven group of peers within the peer-to-peer network (v) by routing messages of the specific broadcast driven group of peers only through members of that group via the mapped peer group ID and not to all peers of the multiple groups of peers on the peer-to-peer network.

* * * * *